United States Patent [19]

Chen

[11] 4,399,012
[45] Aug. 16, 1983

[54] NITROGEN FIXATION METHOD AND APPARATUS

[76] Inventor: Hao-Lin Chen, Walnut Creek, Calif., granted to U.S. Department of Energy under the provisions of 42 U.S.C. 2182

[21] Appl. No.: 291,899

[22] Filed: Aug. 11, 1981

[51] Int. Cl.³ .................... C01B 21/30; C01B 21/24; C01B 21/48
[52] U.S. Cl. .................... 204/179; 423/395; 423/400; 423/405
[58] Field of Search .............. 204/177–179; 423/395, 400, 405

[56] References Cited

U.S. PATENT DOCUMENTS 3,102,788 9/1963 Newman ........................... 423/400
3,666,408 5/1972 Grosse et al. ..................... 423/405

Primary Examiner—F. Edmundson
Attorney, Agent, or Firm—Paul Davis; Harold M. Dixon; Richard G. Besha

[57] ABSTRACT

A method and apparatus for achieving nitrogen fixation includes a volumetric electric discharge chamber. The volumetric discharge chamber provides an even distribution of an electron beam, and enables the chamber to be maintained at a controlled energy to pressure (E/p) ratio. An E/p ratio of from 5 to 15 kV/atm of $O_2$/cm promotes the formation of vibrationally excited $N_2$. Atomic oxygen interacts with vibrationally excited $N_2$ at a much quicker rate than unexcited $N_2$, greatly improving the rate at which NO is formed.

5 Claims, 1 Drawing Figure

NITROGEN FIXATION METHOD AND APPARATUS

The United States Government has rights in this invention pursuant to Contract W-7405-ENG-48 between the U.S. Department of Energy and the University of California for the operation of the Lawrence Livermore National Laboratory.

BACKGROUND OF THE INVENTION

The present invention relates generally to a method and apparatus for achieving nitrogen fixation, and more particularly a method and apparatus for achieving nitrogen fixation in a volumetric discharge chamber having a controlled energy to pressure ratio.

Various methods and apparatus for achieving nitrogen fixation are known. Generally air is introduced into an electric discharge chamber, producing an electric discharge along a relatively narrow band. A localized discharge is produced which is directed to only a small portion of the chamber. Nitrogen fixation using a localized discharge requires a high voltage which fluctuates and produces a high energy to pressure (E/p) ratio within the chamber, e.g., usually higher than 25 kV/atm of $O_2$/cm. Not only is the E/p ratio high, it is also uncontrollable. Maintenance of uncontrolled high E/p ratios results in the vast majority of the energy being absorbed by oxygen, producing atomic oxygen according to the following equation:

$$O_2 + e^- \rightarrow 2O + e^- \qquad (1)$$

The atomic oxygen then interacts with nitrogen to produce NO.

$$O + N_2 \rightarrow NO + O \qquad (2)$$

Reaction (2), however, proceeds at an exceedingly slow rate. Thus the production of NO and hence nitrogen fixation is limited. Typical examples of nitrogen fixation processes which produce a narrow discharge and uncontrollable E/p ratio are disclosed in U.S. Pat. Nos. 1,458,525 and 1,475,995.

The kinetics of reaction (2) can be greatly accelerated by interacting atomic oxygen with nitrogen in the vibrationally excited state, due to a reduction in the activation energy. As used herein, the term vibrationally excited nitrogen means a vibrational temperature equivalent to about 3,000° K. At lower E/p values almost 90% of the energy from the electron beam is absorbed by the vibrational state of nitrogen. However, using a localized discharge of electrons produces a narrow band of electrons in which the E/p ratio cannot be controlled and the formation of vibrationally excited $N_2$ is minimized.

SUMMARY

Accordingly, an object of the invention is to provide a method and apparatus for nitrogen fixation wherein a volumetric electric discharge chamber is provided, and a substantially even distribution of an electron beam is maintained.

Another object of the invention is to provide a method and apparatus for nitrogen fixation wherein the E/p ratio in the electric discharge chamber is controlled.

Yet another object of the invention is to provide a method and apparatus for nitrogen fixation wherein a significant portion of the energy in the electric discharge chamber is absorbed by nitrogen in the vibrationally excited state.

Still another object of the invention is to provide a method and apparatus for nitrogen fixation which promotes the formation of nitrogen oxides by exciting nitrogen in the vibrational state.

Additional objects, advantages and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

To achieve the foregoing and other objects, and in accordance with the purpose of the present invention as embodied and broadly described herein, the method of nitrogen fixation may comprise providing an electric discharge chamber which produces a substantially equal volumetric electron discharge therein. The discharge chamber is maintained at a voltage to pressure ratio of about 5 to 15 kV/atm of $O_2$/cm. Air is introduced into the discharge chamber and an electron discharge is passed therethrough. Atomic oxygen and vibrationally excited nitrogen are produced and allowed to interact to form NO and N. The N interacts with $O_2$ and forms NO and O. Prior to its decomposition, the NO is removed from the discharge chamber.

In a further aspect of the present invention, in accordance with its objects and purposes, the nitrogen fixation apparatus may comprise wall means defining a discharge chamber maintained at a voltage to pressure ratio from about 5 to 15 kV/atm of $O_2$/cm, with the chamber producing a substantially equal volumetric electric discharge therein to form NO from air. Means for providing electrical energy to the discharge chamber, and means for introducing air into the chamber are included. Wall means defining an oxidation chamber in gas-receiving relationship with the discharge chamber are provided. NO from the discharge chamber is thereafter oxidized, producing oxides of nitrogen having a higher oxidation state than NO.

The present invention includes a volumetric electric discharge chamber which produces a substantially even electron beam distribution throughout the chamber, and more particularly, throughout that portion of the chamber where nitrogen fixation occurs. The even distribution of the discharge enables the chamber to be operated at a lower voltage and eliminates voltage fluctuation associated with localized discharges. As a result, the E/p ratio within the chamber is controlled, and a ratio which promotes the formation of vibrationally excited $N_2$ maintained. Atomic oxygen (also formed within the discharge chamber) reacts with the vibrationally excited $N_2$ to produce NO at a rate much faster than if the $N_2$ were not vibrationally excited, producing a chain reaction in which atomic oxygen and NO are generated. The rate of NO production is at least 10 times faster than methods previously known.

DESCRIPTION OF THE DRAWING

The accompanying drawing, which is incorporated and forms a part of the specification, illustrates an embodiment of the present invention, and, together with the Description, serves to explain the principles of the invention.

DESCRIPTION

Figure 1:
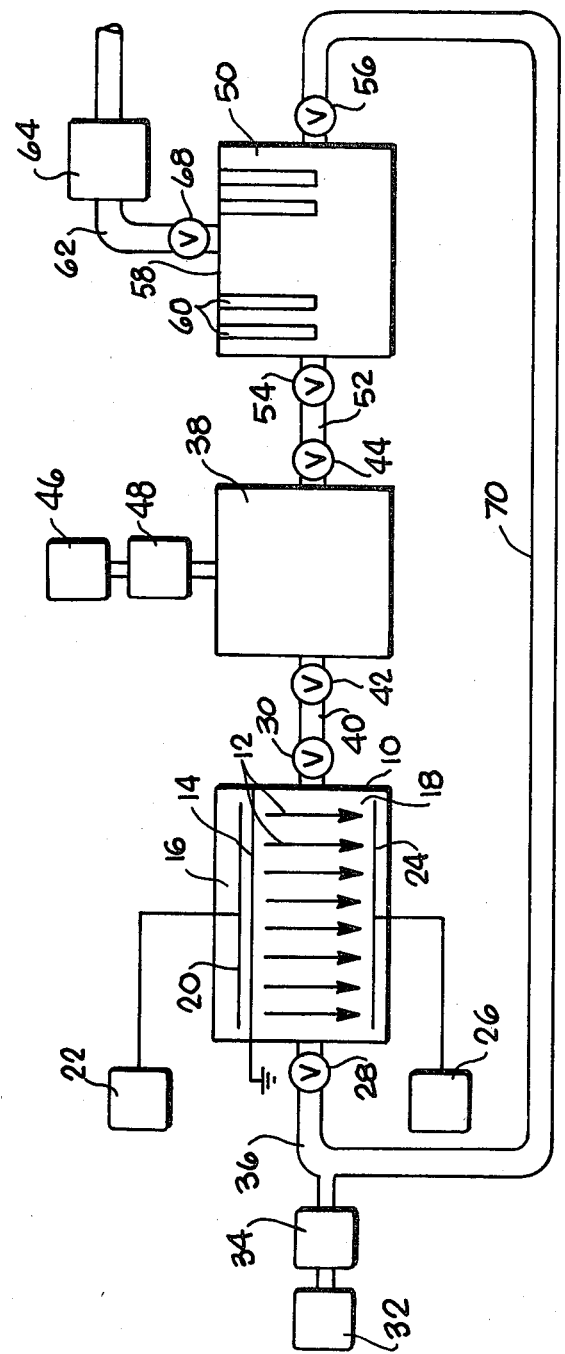
FIG. 1 is a schematic diagram of a nitrogen fixation apparatus.

It has now been unexpectedly discovered that oxides of nitrogen can be produced from air at least 10 times faster than previous methods by using a volumetric electric discharge chamber instead of a chamber which only produces a localized discharge. With a volumetric discharge chamber, a substantially even electron beam is generated throughout that portion of the chamber where nitrogen fixation occurs. As a result, lower voltages are used, a controllable energy to pressure (E/p) ratio is produced, and the desired E/p ratio which promotes the formation of $N_{2(vib)}$ maintained. Throughout this disclosure $N_{2(vib)}$ represents $N_2$ in the vibrationally excited state. A volumetric discharge chamber is defined herein as the even and controllable discharge of electrons (in the form of an electron beam) throughout the entire volume of the chamber where the nitrogen fixation occurs, as opposed to a localized uneven discharge.

The electron beam initially ionizes the gas within the chamber, causing the gas to become a conductor. Energy within the system is then controllable and the majority of it absorbed by nitrogen producing $N_{2(vib)}$. Previous nitrogen fixation methods disregarded the importance of controlling the E/p ratio.

To maximize $N_{2(vib)}$ production an E/p ratio of from about 5 to 15 kV/atm of $O_2$/cm is preferred, 7-12 kV/atm of $O_2$/cm is more preferred, and 10 kV/atm of $O_2$/cm is the most preferred. When air is subjected to an electron beam in a volumetric discharge chamber maintained at an E/p ratio of from 5 to 15 kV/atm of $O_2$/cm, the following reactions occur:

$$O_2 + e^- \rightarrow 2O + e^- \quad (3)$$

$$N_2 + e^- \rightarrow N_{2(vib)} + e^- \quad (4)$$

Thereafter, atomic nitrogen is generated and NO produced.

$$O + N_{2(vib)} \rightarrow NO + N \quad (5)$$

$$N + O_2 \rightarrow NO + O \quad (6)$$

A chain reaction is produced with (4) supplying atomic O necessary for (3). NO is thereafter oxidized in an oxidation chamber to form higher oxidation state nitrogen oxides useful in the production of $HNO_2$. A separation chamber may then be employed to separate the higher oxidation state nitrogen oxides from $N_2$, $O_2$ and other atmospheric gases.

Referring now to the nitrogen fixation apparatus of FIG. 1, a volumetric discharge chamber 10 is used to effect the irradiation of air, e.g., $N_2$ and $O_2$, with an electron beam 12. Discharge chamber 10 is comprised of aluminum walls, and has a pressure separation wall member 14 which divides the chamber into a first segment 16 maintained under high vacuum of approximately $10^{-4}$ to $10^{-7}$ torr, and a second segment 18 maintained at about atmospheric pressure. Wall member 14 is preferably a foil of a metallic substance such as aluminum and grounded. A vacuum environment within segment 16 is necessary to produce free electrons. The free electrons then form electron beam 12 which is directed through wall member 14, providing an even distribution of the beam throughout segment 18. Atmospheric gases within segment 18 become conductive and the E/p ratio maintained by controlling the voltage across the electrodes and the intensity of the electron beam. Thereafter, a discharge is effected which produces $N_{2(vib)}$.

Disposed within segment 16 is a first electrode 20 connected to a high voltage power source 22. A second electrode 24, connected to a second high voltage source 26, is disposed within segment 18. The electrodes have relatively large surface areas, e.g., 1 m by 0.1 m. Examples of suitable electrodes include thermionic and field emission sources. Each power source is comprised of a high voltage transformer, switches and capacitors. The two electrodes are maintained at different potentials (50-250 kV), resulting in the generation of electron beam 12 and formation of a controllable discharge within segment 18 to maximize the formation of $N_{2(vib)}$. The preferred electron beam density is about 1 amp/$cm^2$ resulting in a current density within segment 18 of about 7 amp/$cm^2$, and an E/p ratio of about 5 to 15 kV/atm of $O_2$/cm. Ultimately, NO is formed within chamber 10.

To provide for the introduction and removal of gases to and from chamber 10, a pair of valves 28 and 30 are disposed at opposite walls of the chamber. The valves are of conventional design, and may be either manually or mechanically controlled. An air pump 32 and blower 34 introduce air into discharge chamber 10. The air may be directly introduced into the chamber, or it can be first introduced into a conduit 36 which in turn is connected to valve 28. Conduit 36 is formed of any economical material which is insensitive to NO. Such materials include aluminum, polyvinylchloride and the like.

Pump 32 and blower 34 provide a pressure differential which forces air into discharge chamber 10. Additionally, the created pressure differential is the driving force throughout the entire apparatus for providing gas flow from one unit to the next, e.g., chamber to chamber.

Air within discharge chamber 10 remains therein only long enough to form NO. A residence time of from 0.5 to 5 seconds is preferred. Before the NO begins to decompose, valve 30 is opened while valve 28 is closed, and NO, along with $N_2$, $O_2$ and other gases which have not been converted to NO are removed from the chamber.

Gases removed from discharge chamber 10 are subsequently introduced into an oxidation chamber 38. Oxidation chamber 38 may be either directly adjacent to discharge chamber 10 or connected by means of a conduit 40, comprised of the same material as conduit 36. In either case, oxidation chamber 38 is in gas-receiving relationship with discharge chamber 10. Oxidation chamber 38 is formed from walls made of a material such as aluminum. Valves 42 and 44 are positioned at opposite ends of the chamber to control the flow of gases entering the chamber and their removal therefrom. Again, valves 42 and 44 are of a conventional design, operated either manually or mechanically.

NO, $N_2$, $O_2$ and other gases received from discharge chamber 10 remain in oxidation chamber 38 long enough to effect oxidation of NO to oxides of nitrogen having higher oxidation states. Such compounds include $NO_2$, $NO_3$, $N_2O_4$, $N_2O_5$ and the like. $NO_2$ is predominantly formed. If the amount of $O_2$ received from discharge chamber 10 is insufficient to complete the oxidation of the NO within chamber 38, an air pump 46 and blower 48 can be used to introduce additional air ($O_2$) therein. To promote oxidation, one or more oxidation catalysts may be disposed within the oxidation chamber. Examples of suitable catalysts include platinum, oxides or salts of transition metals of variable valence, and the like.

Once the formation of the higher oxidation state nitrogen oxides is complete, valve 44 is opened, the gases within chamber 38 are then removed therefrom and introduced into a separation chamber 50. Chamber 50 is in gas-receiving relationship with oxidation chamber 38. A conduit 52 can be used to connect the two chambers, or alternatively they may be positioned directly adjacent to each other. Valves 54 and 56, disposed at opposite walls of separation chamber 50, again are of conventional design, and may be either manually or mechanically controlled. Disposed within the top wall 58 of separation chamber 50 are a plurality of wells 60 which extend into the interior of the chamber. Each well is open at the top and adapted to receive a cooling medium such as dry ice or liquid nitrogen.

Walls 60 are filled with one of the above cooling mediums after which the gases from oxidation chamber 38 are introduced into separation chamber 50. The oxides of nitrogen have a higher melting point than the other gases introduced into separation chamber 50 and thus solidify on the exterior walls of the wells. Value 56 is then opened, and the gases remaining in the chamber are removed therefrom. A conduit 70 connects separation chamber 50 with discharge chamber 10 in order to recycle the atmospheric gases which have not been converted to oxides of nitrogen. Alternatively, the atmospheric and waste gases within separation chamber 50 can be evacuated and released into the atmosphere. Once chamber 50 has been evacuated, the interior temperature of the chamber is increased sufficiently to vaporize the solidifed nitrogen oxides. This is achieved by removing the cooling medium from wells 60, or by applying heat to the entire chamber. A conduit 62 connects the chamber to a pump 64, drawing the gaseous nitrogen oxides from the chamber and into a collection vessel. A valve 68 separates the chamber from the conduit.

The nitrogen oxides produced are useful intermediate products in the production of $HNO_3$. $HNO_3$ is employed in the manufacture of inorganic and organic nitrates, and nitro compounds for fertilizers, dye intermediates, explosives, and many different organic chemicals.

The foregoing description of a preferred embodiment of the invention has been presented for purposes of illustration and description. It is not intended to be exhaustive or to limit the invention to the precise form disclosed, and obviously many modifications and variations are possible in light of the above teaching. It is intended that the scope of the invention be defined by the claims appended hereto.

I claim:

1. A method of nitrogen fixation, comprising:
providing an electric discharge chamber which produces a substantially equal volumetric electron discharge therein;
maintaining said discharge chamber at a voltage to pressure ratio of about 5 to 15 kV/atm of $O_2$/cm;
introducing air into said discharge chamber;
passing an electrical discharge through said discharge chamber while air is disposed therein;
forming O and vibrationally excited $N_2$ in said discharge chamber;
interacting O and vibrationally excited $N_2$ within said discharge chamber to form NO and N;
interacting N and $O_2$ within said discharge chamber and form NO and O; and
removing NO from said discharge chamber prior to its decomposition.

2. The method according to claim 1, further comprising:
introducing NO from said discharge chamber into an oxidation chamber;
introducing $O_2$ into said oxidation chamber;
interacting the NO and $O_2$ within said oxidation chamber and
forming oxides of nitrogen having a higher oxidation state than NO.

3. The method according to claim 2, further comprising:
removing the higher oxidation state oxides from said oxidation chamber;
introducing the higher oxidation state oxides into a separation chamber; and
separating the higher oxidation state oxides from all other gases in said separation chamber.

4. The method according to claim 3, comprising:
lowering the temperature of said separation chamber after the higher oxidation state oxides have been introduced therein;
solidifying the higher oxidation state oxides in said separation chamber;
evacuating any gases remaining within said separation chamber;
raising the temperature of said separation chamber sufficiently to form gases of the solidified higher oxidation state oxides; and
removing the gaseous higher oxidation state oxides from said separation chamber.

5. The method according to claim 1, wherein said voltage to pressure ratio in said discharge chamber is about 10 kV/atm of $O_2$/cm.

* * * * *